United States Patent [19]

Troutner

[11] 4,033,391

[45] July 5, 1977

[54] APPARATUS AND METHOD FOR FORMING PLANKS FOR USE IN CHORD COMPONENTS OF INTEGRAL TRUSS-SUPPORTED DECKS

[75] Inventor: Arthur L. Troutner, Boise, Idaho

[73] Assignee: Trus Joist Corporation, Boise, Idaho

[22] Filed: Mar. 26, 1976

[21] Appl. No.: 670,836

[52] U.S. Cl. ............................... 144/321; 144/3 R; 144/325; 144/35 R; 144/93 R; 144/309 R; 269/304; 271/236; 408/29

[51] Int. Cl.² ........................ B27C 3/04; B23P 3/00

[58] Field of Search ............ 144/1 R, 2 R, 3 R, 92, 144/93 R, 35 R, 321, 322, 323, 325, 309 R; 408/108, 115 R, 115 A; 269/304, 87.3, 308, 315, 13; 198/29; 271/236, 250; 248/1; 156/583

[56] References Cited

UNITED STATES PATENTS

| | | | |
|---|---|---|---|
| 3,552,254 | 1/1971 | Marczy | 269/304 X |
| 3,695,318 | 10/1972 | Maury | 144/35 R |
| 3,894,730 | 7/1975 | Reiter | 269/13 |
| 3,908,980 | 9/1975 | Fowler | 271/236 X |

*Primary Examiner*—Othell M. Simpson
*Assistant Examiner*—W. D. Bray
*Attorney, Agent, or Firm*—Eugene D. Farley

[57] ABSTRACT

Method for forming planks for use in chord components of integral truss-supported decks comprises placing the squared off leading edge of a blank, unprocessed plank on a supporting frame; indexing the plank longitudinally and laterally in the frame accurately locating it for drilling; and drilling splice plate locating holes at each extremity of the plank, and side connector holes in a spaced relation along the sides of the plank, with the aid of drill jigs located above the frame.

The apparatus includes a frame, for supporting the planks, having an end stop located at one end for accurately locating the plank longitudinally in the frame, a side stop located along one side for accurately locating the plank laterally in the frame, and indexing means for indexing the plank with the side stop and maintaining it there. A leading edge drill jig is located at the leading edge of the frame and a trailing edge drill jig is located at the trailing edge of the frame for drilling splice plate locating holes in the leading edge and the trailing edge respectively of the board. An edge drill jig is located above the frame for drilling side connector holes along the longitudinal margins of the plank in a spaced relationship. The drill jigs include drill guides configured to receive the drill bit of a hand-held drill snugly. The drill guides are positioned in the drill jigs for locating the holes in the planks with precision accuracy.

9 Claims, 13 Drawing Figures

APPARATUS AND METHOD FOR FORMING PLANKS FOR USE IN CHORD COMPONENTS OF INTEGRAL TRUSS-SUPPORTED DECKS

BACKGROUND OF THE INVENTION

This invention relates to structural deck assemblies. It pertains in particular to forming planks for use in chord components of a truss-supported deck having a long span.

Troutner, U.S. Pat. No. 3,019,491 discloses a composite truss-supported deck wherein the deck panels are used as the chords of the truss. Troutner, U.S. Pat. No. 3,723,230 discloses a continuous press for pressing glue coated consolidatable press charges, in particular glue coated wood veneers, into massive laminated planks measuring, for example, 80 feet long, 2 feet wide and nearly 2 inches thick.

These massive planks are joined end to end by means of splice plates forming chord components which in turn are joined side by side by means of side connectors creating integral, truss-supported, clear span, domed decks of great length, and of the general class set forth in Troutner U.S. Pat. No. 3,019,491 aforesaid, for use in spanning wide building structures such as stadia and the like.

In constructing decks of this type the planks must be predrilled for ease of mounting the planks to the tie elements and to the side connectors when the planks are assembled into a composite deck assembly. Furthermore, in order to allow onsite assembly of the decks the holes thus drilled must be located in the planks with precision accuracy and the planks must be cut accurately to the proper length. Precision accuracy is particularly important when the decks have the tremendous width and span necessary for covering structures such as stadia, where a large number of the planks are utilized in each dimension. Thus any small drilling error in each plank becomes cumulative creating a larger error in the assembly. Heretofore, means have not been available for drilling the planks with sufficient accuracy to allow fabrication of decks of this magnitude.

Accordingly, it is the principal purpose of the present invention to provide a method of forming planks with precision accuracy for use in chord components of an integral, truss-supported, clear span deck of great length, for example, an error of 1/32-inch in a span of over 400 feet.

It is a further object of the present invention to provide an apparatus for forming such planks.

It is still another object of the present invention to provide such an apparatus having means wherein the planks may be indexed accurately therein.

It is still another object of the present invention to provide such an apparatus which allows the planks to be formed quickly and easily without the necessity of using highly skilled labor.

THE DRAWINGS

The manner in which the foregoing and other objects of the invention are accomplished will be apparent from the accompanying specification and claims, considered together with the drawings, wherein:

GENERAL STATEMENT OF THE INVENTION

The method of the present invention broadly comprises placing a plank having a squared off leading edge onto the frame of a drill aligning apparatus, indexing it laterally and longitudinally in the apparatus for accurate alignment with drill jigs mounted on the frame, and drilling splice plate locating holes at each end of the plank and side connector holes in a spaced relation along its side. The plank then is sawed squarely at its trailing edge accurately to a desired length for use in chord components of integral truss-supported decks.

The apparatus of the present invention includes an elongate frame with an end stop and a side stop for supporting and accurately positioning the plank. Indexing means such as hydraulic cylinders register the longitudinal margin of the plank with the side stop and maintain it in proper registration. Leading edge and trailing edge drill jigs located at the respective ends of the frame above the plank contain spaced arrays of drill guide means for drilling splice plate attachment holes in predetermined patterns in the plank. An edge drill jig located on the medial portion of the frame above the plank contains drill guide means which are positioned for drilling side connector holes in a staggered pattern along the sides of the plank. Spacer bars interconnect adjacent drill guide means and edge bars interconnect alternate drill guide means for positioning the drill guide means accurately relative to one another and to the frame.

DETAILED DESCRIPTION OF A PREFERRED EMBODIMENT

Figure 1:
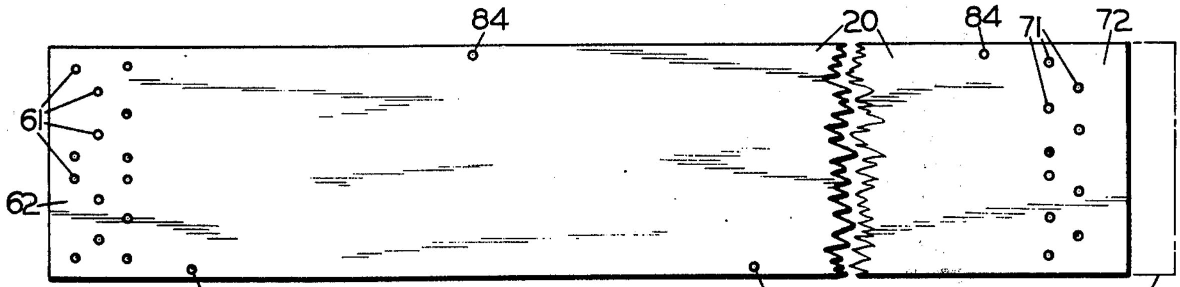
FIG. 1 is a foreshortened plan view of a plank formed in the apparatus of the present invention.
Figure 2:
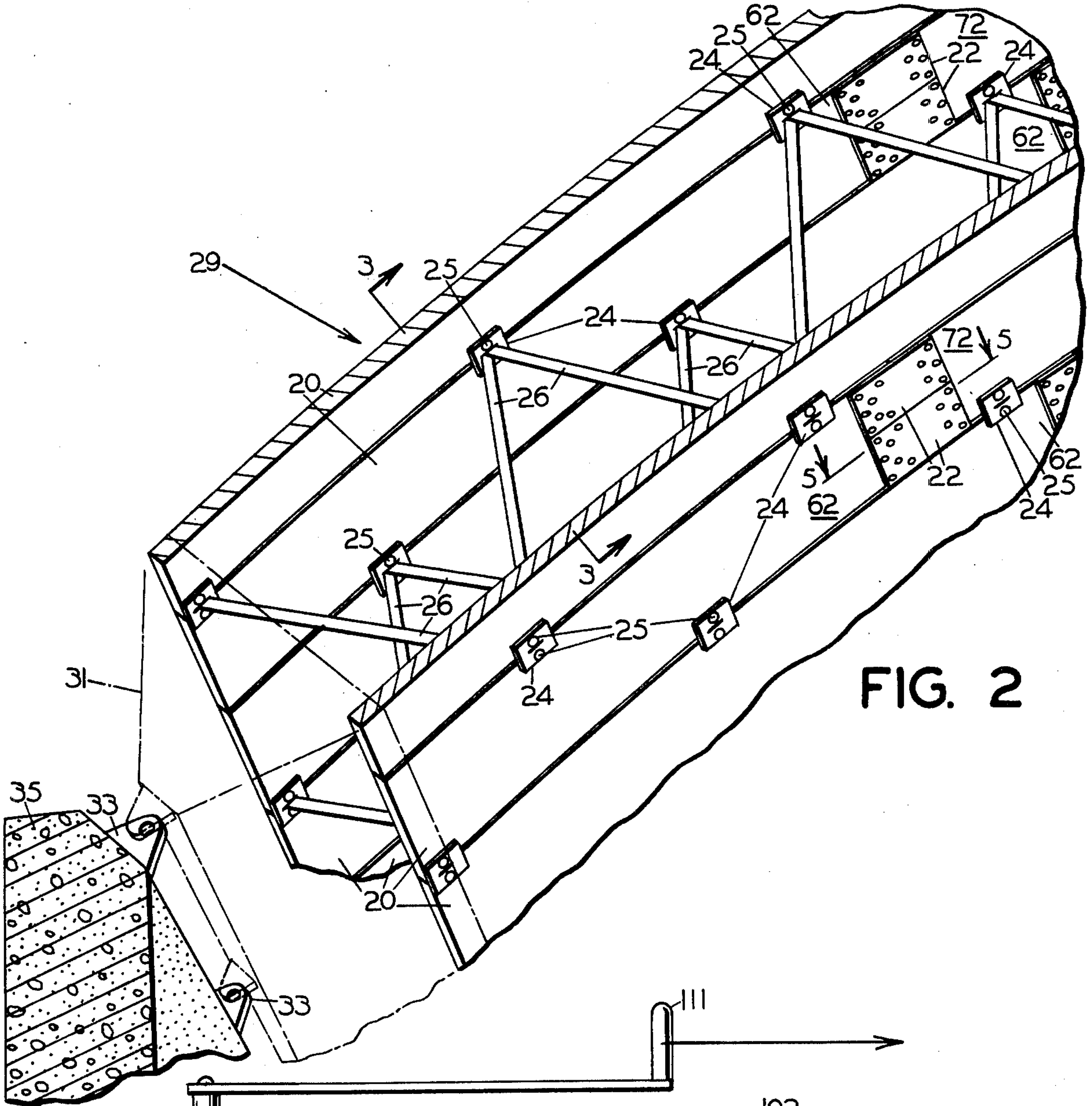
FIG. 2 is a fragmentary, sectional view in perspective, showing the installation of the plank in an integral truss-supported deck.
Figure 5:
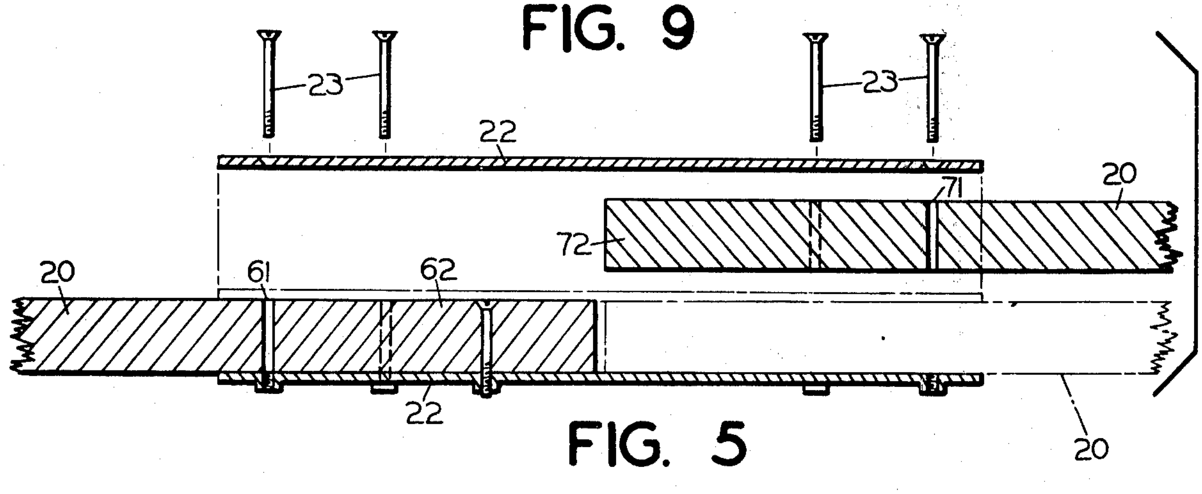
FIG. 5 is a cross sectional view, partially exploded, taken along the line 5—5 of FIG. 2.

Referring to FIGS. 1 and 2, the chord components formed by the present invention generally comprise wood planks 20 tied together end to end by metal tie plates 22 and bolts 23 (FIG. 5) into units up to several hundred feet in length. The planks comprise massive elements which may measure, for example, 80 feet in length, 2 feet in width and approximately 2 inches in thickness. Preferably the planks are laminated as described in Troutner U.S. Pat. No. 3,723,230. However, they may comprise sawn boards or non-wood elements.

Figure 4:
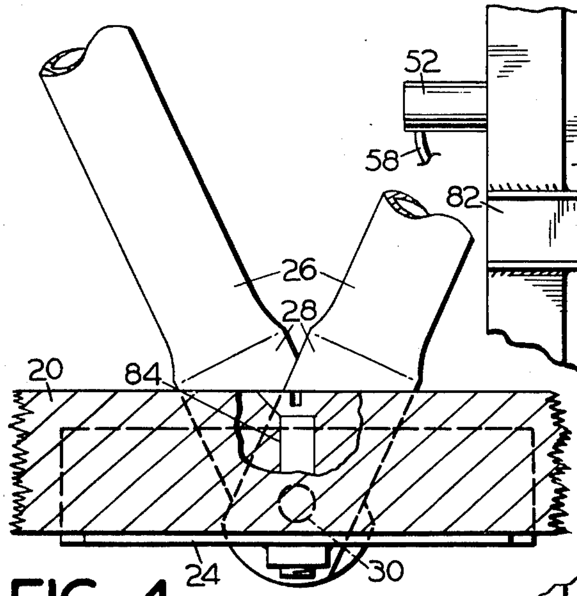
FIG. 4 is a fragmentary cross sectional view taken along the line 4—4 of FIG. 3.
Figure 3:
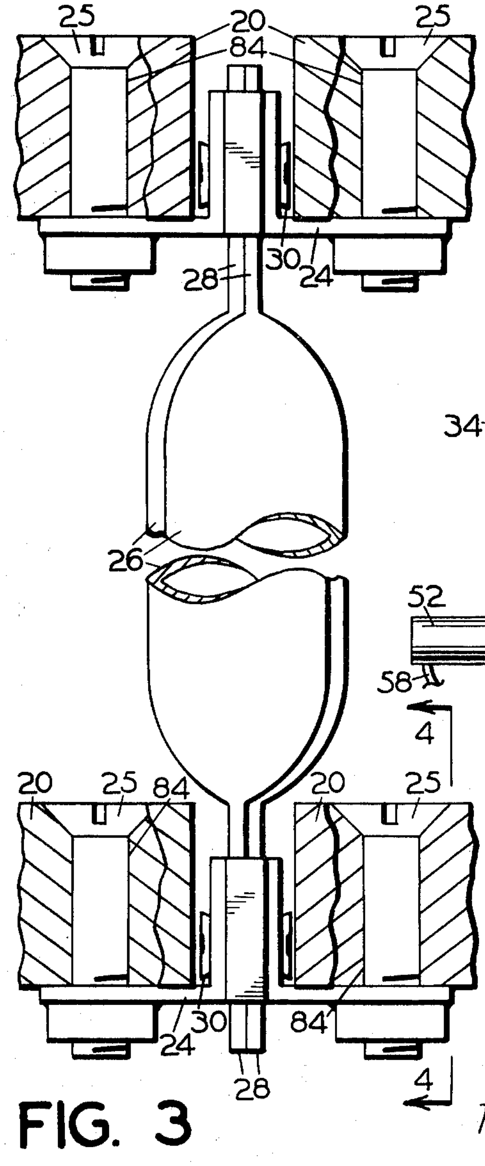
FIG. 3 is a fragmentary, foreshortened, cross sectional view taken along the line 3—3 of FIG. 2.

As best shown in FIGS. 2, 3, and 4, the chord components are joined side by side with side connectors 24, which are attached to the edges of the planks in a spaced relationship by bolts 25, forming top and bottom decks. Webbing comprising steel web components 26 having flat web ends 28 join the top and bottom decks together into the completed truss-supported deck 29. The web members interconnect the chords in a zig-zag fashion with the flat web ends connected between adjacent planks by means of riveted pins 30 inserted into openings in the side connectors 24. Brackets 31 shown in phantom in FIG. 2 are attached to the ends of the decks for joinder with hangers 33 attached to the supporting structure 35. The decks may be assembled flat or arched as desired. The deck illustrated in FIG. 2 has a domed contour for spanning a large distance such as in a stadium covering.

Figure 7:
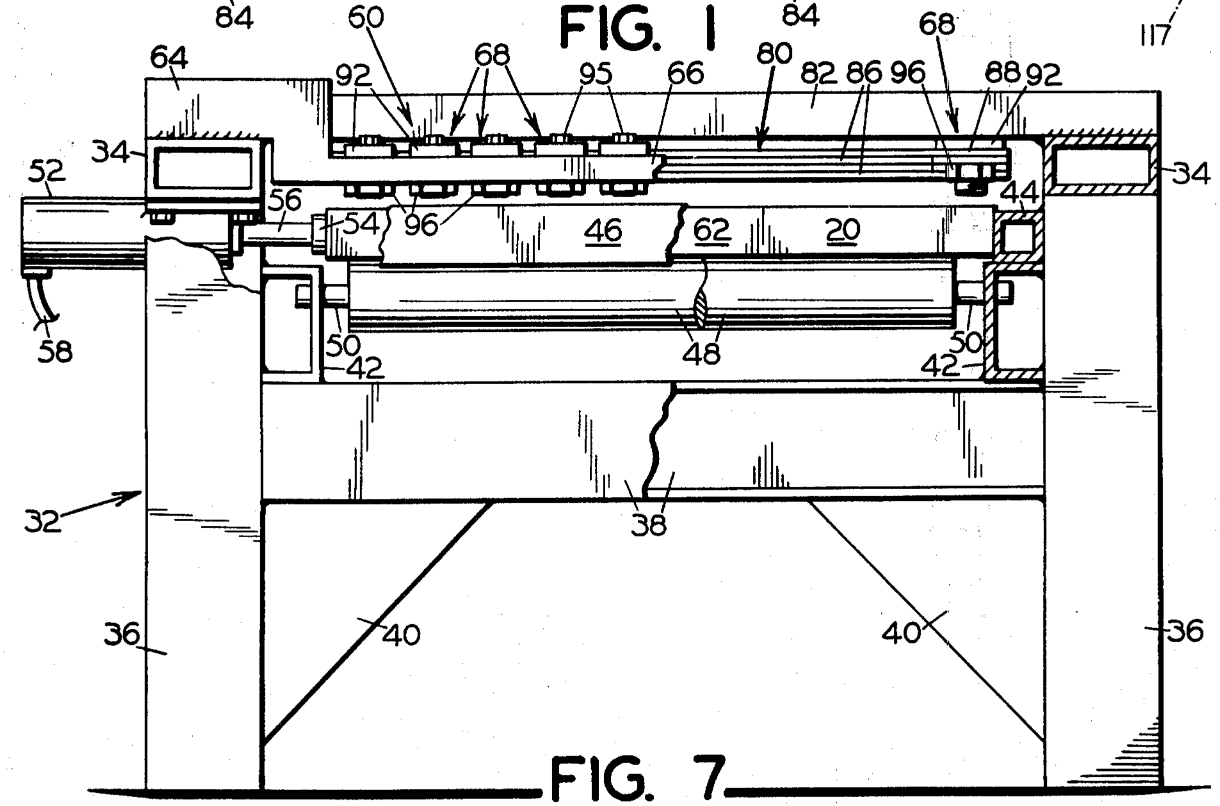
FIG. 7 is a cross sectional view in end elevation, partially broken away, taken along the line 7—7 of FIG. 6B.
Figure 6B:
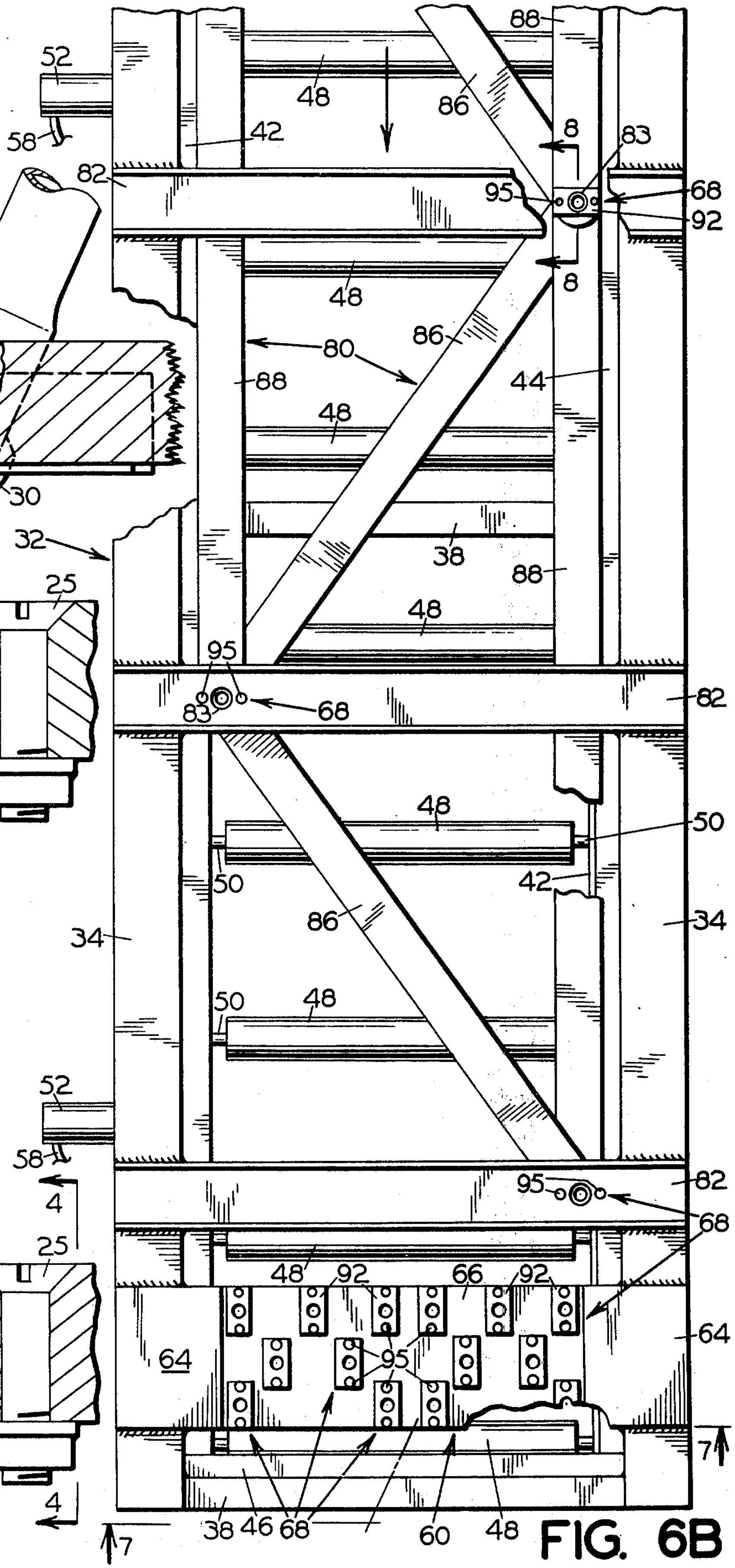
FIGS. 6A and 6B are fragmentary, foreshortened plan views, separated end to end and partially broken away, of the apparatus of the present invention.
Figure 6A:
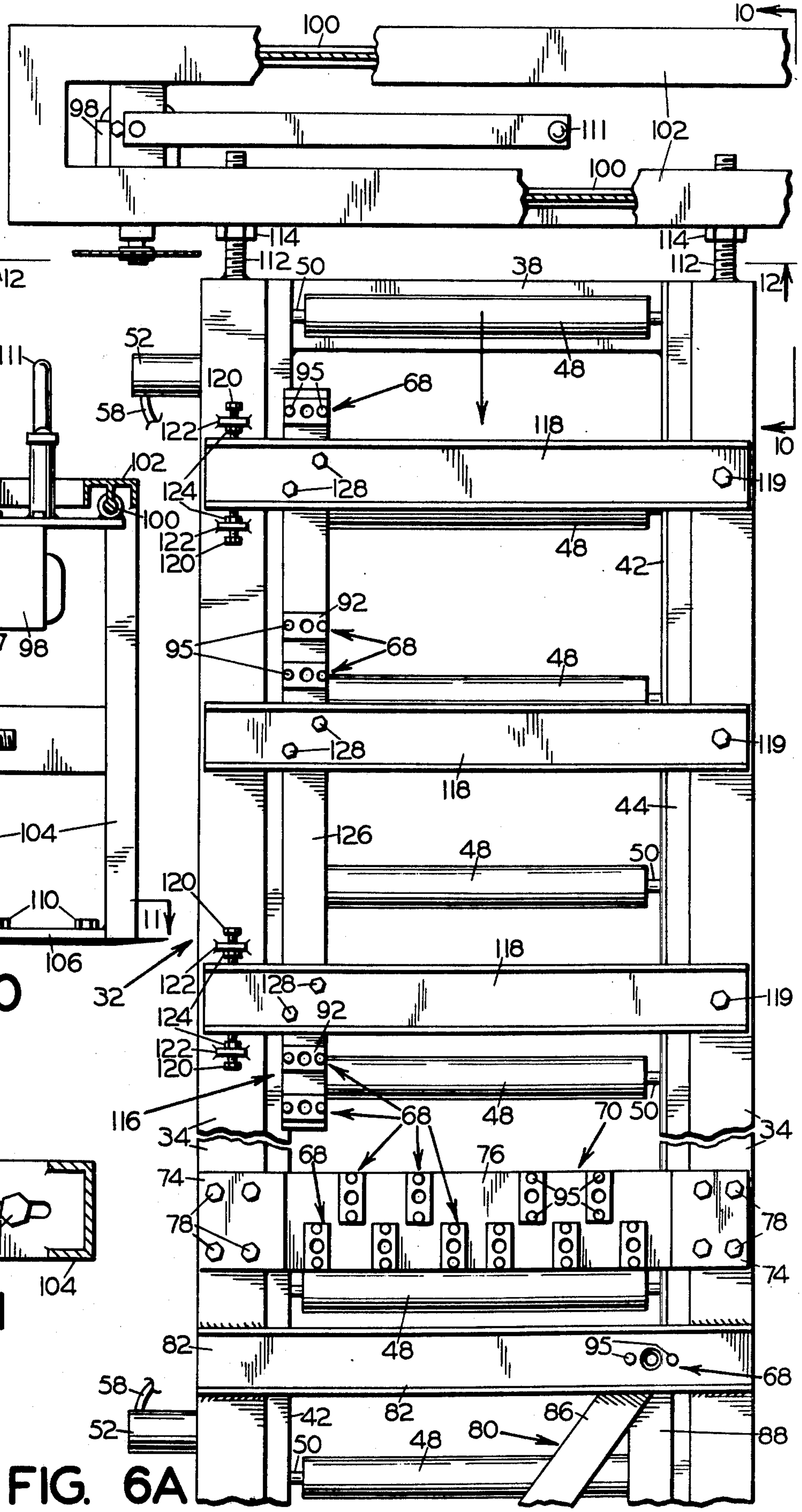

The present invention is used for preparing the planks for assembly by predrilling blank unprocessed planks accurately for mounting the tie plates and the side connectors, and cutting the planks to the desired length with their ends properly spaced relative to the drilled holes. Referring to FIGS. 6A, 6B, and 7, the apparatus is supported above the floor by a frame 32 comprising box-shaped side elements 34 which are joined at spaced intervals to legs 36. The legs are interconnected intermediate their ends by channel beams 38. Triangular gusset plates 40 are attached between the channels and the legs.

C-shaped roller support beams 42 joined to the tops of the channels 38 extend the longitudinal extent of the apparatus spanning the legs on each side. Joined to the top of one of the roller support beams is a side stop 44 comprising a square section beam. An end stop 46, joined to the legs, spans the leading edge of the apparatus approximately coplanar with the side stop.

Rollers 48 are located transversely in the apparatus at spaced locations. The rollers are joined rotatably by bearings to shafts 50 which are supported by the roller support beams 42. The rollers are positioned vertically in such a manner that their upper peripheral portions substantially are coplanar with the side stop and end stop.

Means, such as double-acting hydraulic cylinders 52, are included for positively registering the longitudinal margin of the plank with the side stop. The cylinders are attached to the frame side element opposite the side stop. Pads 54 are mounted on the ends of the hydraulic cylinder rams 56 for engaging the edge of the plank. Control means (not shown) controls the flow of pressurized hydraulic fluid to the hydraulic cylinders through tubing 58, allowing the cylinders to move simultaneously between extended and retracted positions.

Attached to the leading edge of the frame, inwardly adjacent to the end stop, is a leading edge drill jig 60 for drilling the splice plate attachment holes 61 in the leading edge 62 of the plank, FIG. 6B. It comprises mounting portions 64 at each end for attachment to the frame side elements 34 and a depressed central portion 66 mounting a plurality of individual drill guide means 68 arranged in a manner for drilling the hole pattern shown in the left hand end of the plank in FIG. 1. In the embodiment shown, the hole pattern comprises three rows having four, four and six spaced holes, respectively.

Located near the opposite or trailing edge of the frame is trailing edge drill jig 70 (FIG. 6A) for drilling the splice plate holes 71 in the trailing edge 72 of the plank, FIG. 6B. The mounting portions 74 and central portion 76 of the trailing edge drill jig are similar to those in the leading edge drill jig. However, they are narrower since they mount only two rows of drill guide means 68 rather than three. Thus the drill guide means are arranged for drilling the hole pattern in the right hand end of the plank as shown in FIG. 1 comprising one row of four holes and one row of six holes.

The trailing edge drill jig has holes located in the mounting portions 74 so that the drill jig may be attached releasably to the frame, by means of bolts 78. Thus it may be positioned at alternate positions longitudinally along the frame for forming planks of different lengths.

Located on top of the frame and extending between the leading edge and trailing edge drill jigs is edge drill jig 80, FIG. 6B. The edge drill jig includes U-shaped cross braces 82 attached transversely to the top of the frame at spaced intervals. A bore 83 is located near alternate ends of adjacent cross braces for receiving drill guide means 68. The holes are positioned longitudinally in the cross braces in a manner to place the side connector holes 84 thus drilled a short distance inwardly from the edges of the plank in the zig-zag pattern shown in FIG. 1.

Figure 9:
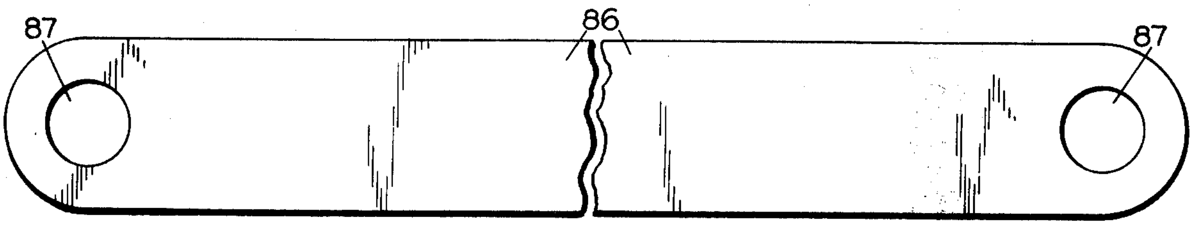
FIG. 9 is a foreshortened plan view, in isolation, of a spacer bar which is an element of the present invention.

Interconnecting the drill guide means which are located in adjacent cross braces are spacer bars 86. The spacer bars, shown in FIG. 9, comprise elongate flat lengths of bar stock having rounded terminal portions and openings 87 accurately located longitudinally at each end. Since the drill guide means are located at opposite ends of adjacent cross bars, the spacer bars are diagonal in relation to the frame, forming a zig-zag pattern.

Edge bars 88 configured similarly to the spacer bars, except longer, interconnect adjacent drill guide means which are located on like ends of the cross braces. Thus the edge bars substantially are parallel to the frame side elements and span between three cross braces.

Figure 8:
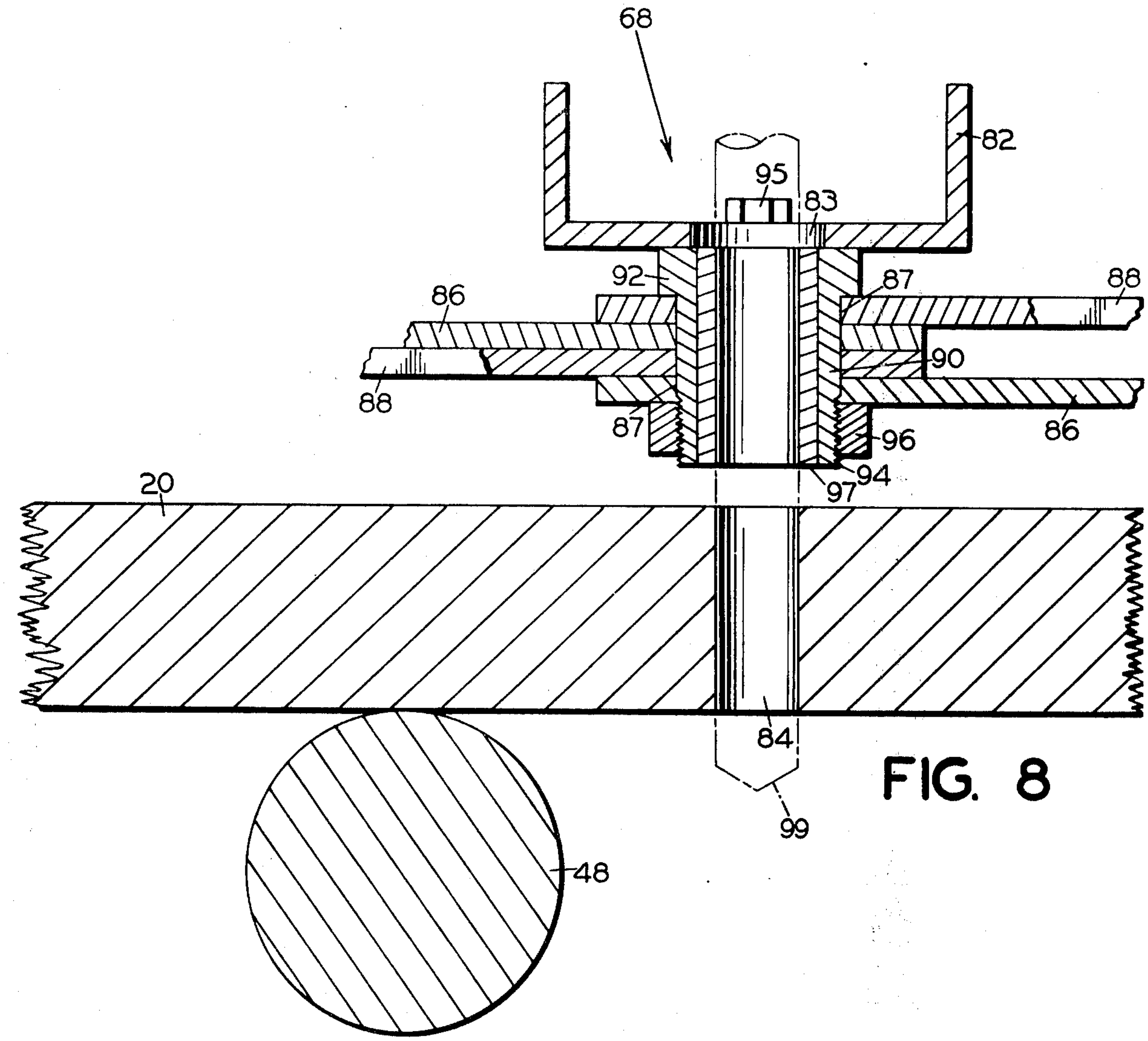
FIG. 8 is a fragmentary cross sectional view taken along the line 8—8 of FIG. 6B.

Each of the drill guide means 68, beset shown in FIG. 8 as installed in the edge drill jig, includes a cylindrical body 90 with a larger diameter boss 92 at one end and a threaded portion 94 at the other end. The cylindrical body has a length adequate to mount the two spacer bars 86 and the two edge bars 88 which are coupled to each drill guide means. Flanges extending from the sides of the boss contain threaded bores for receiving bolts 95 passing through openings in the cross braces for mounting the drill guide means therein. A nut 96 configured for engagement with the threaded portion 94 of the drill guide means clamps the spacer bars and the edge bars thereon. A cylindrical liner 97 is configured for a force fit within the central body for receiving a drill bit 99. When the drill guide means is utilized on the leading edge and trailing edge drill jigs 60 and 70, the cylindrical body is inserted through an opening in each central portion 66 or 76, respectively, and the nut is installed securing the central portion between the boss 92 and nut 96.

In the drawings, the cross braces 82 are shown as being welded to the frame, FIGS. 6A and 6B. When the apparatus is constructed the entire edge drill jig is assembled and aligned accurately on the frame prior to the welding. Thus the drill guide means spacing is set by the length of the spacer bars and edge bars which are dimensioned and drilled to close tolerances.

Figure 12:
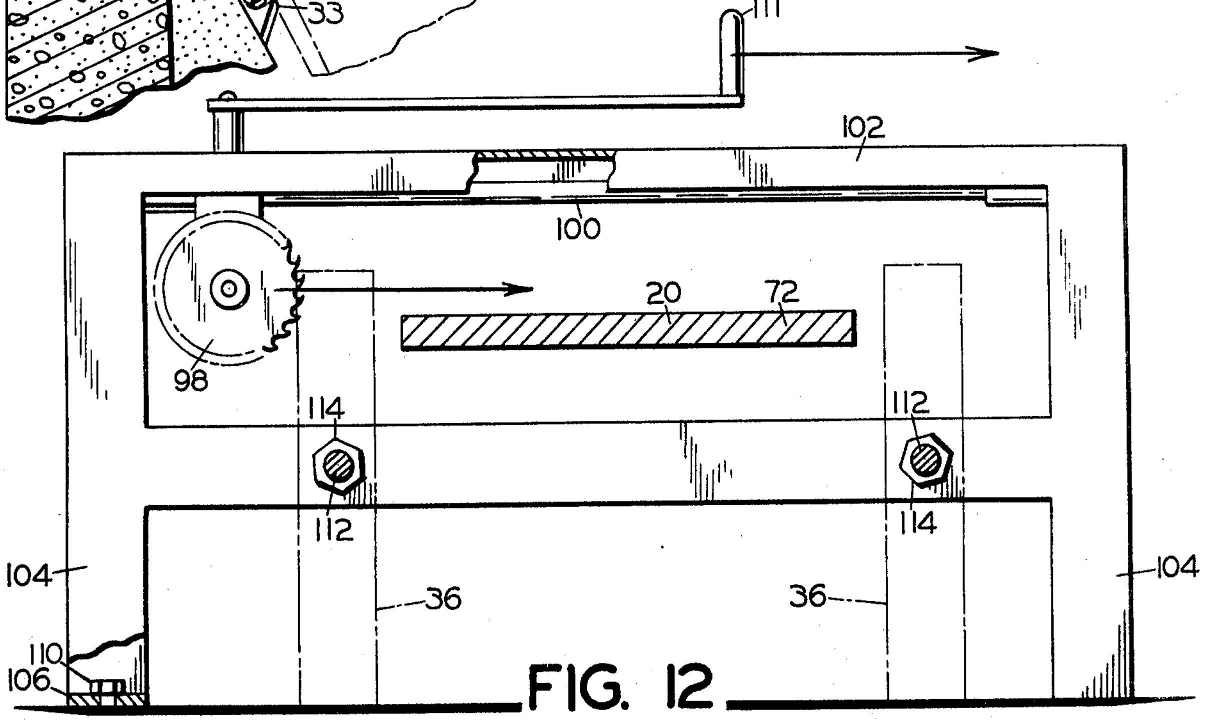
FIG. 12 is a cross sectional view taken along the line 12—12 of FIG. 6A.
Figure 10:
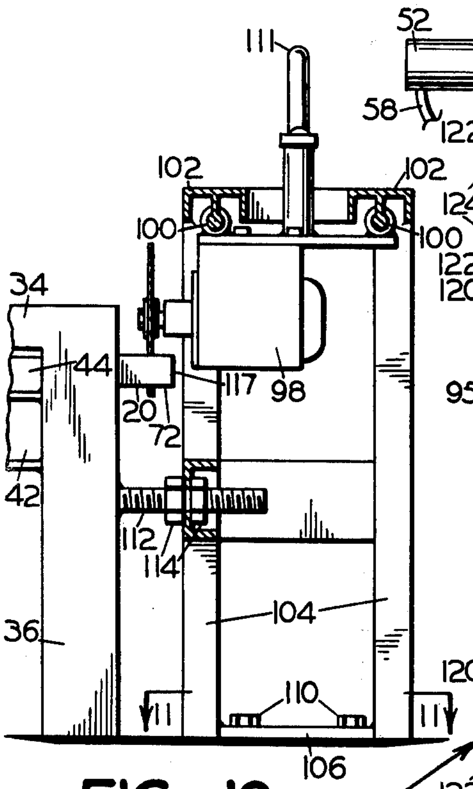
FIG. 10 is a fragmentary cross sectional view taken along the line 10—10 of FIG. 6A.
Figure 11:
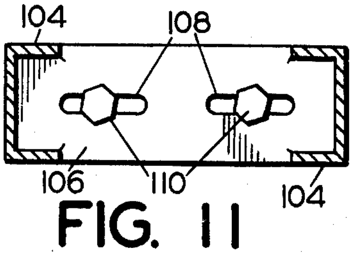
FIG. 11 is a cross sectional view taken along the line 11—11 of FIG. 10.

A rotary saw 98, FIGS. 6A, 10 and 12, is located in front of the trailing edge of the frame for cutting the plank to a desired length. The saw is suspended slidably on ways 100 for free movement transversely with respect to the longitudinal axis of the frame. The ways are suspended from top channels 102 of a support 104 which is attached to the floor adjacent to the frame 32. The bottom plate 106 of the support includes slots 108 through which bolts 110 pass allowing positioning of the saw relative to the frame. A handle 111 is mounted on top of the saw for operator manipulation of the saw on the ways for sawing the plank.

Extending from joinder with the legs 36 of frame 32 are threaded rods 112 which pass through openings in the saw support 104. Nuts 114 are configured to engage the rods on each side of the support for adjusting the saw accurately relative to the frame, allowing the saw to cut the plank normal to its longitudinal axis.

Indexing means 116 located (FIG. 6A) on the frame between the trailing edge drill jig and the saw allow positioning the plank accurately longitudinally for cutting the trailing margin 117 of the plank.

Cross elements 118 are located on the frame transversely at spaced intervals. Bolts 119 join one of the ends of the cross elements to the frame releasably in a pivotal manner, allowing movement of the other ends longitudinally along the frame. The other ends of the cross elements are secured to the frame by means of paired adjusting bolts 120 which pass perpendicularly to the cross elements through threaded ears 122 attached to the frame on each side of the cross elements. Lock nuts 124 mounted on the adjusting bolts secure the adjusting bolts at the desired position in the ears. Thus the ends of the cross elements may be positioned accurately longitudinally along the frame.

Suspended below the adjustable end of the cross elements 118 is index bar 126. Bolts 128 releasably join the index bar to the cross elements in a manner such that they may always be aligned normal to each other. Drill guide means 68 are located at spaced intervals in the index bar in alignment with a vertical plane passing through the drill guide means in the edge drill jig 80.

OPERATION

The manner of use of the herein described apparatus is as follows:

Preparatory to drilling of a plank 20 the edge drill jig 80 must be aligned and mounted on the frame 32. To this end the cross braces 82 are positioned generally at their desired locations transversely on the frame and the drill guide means 68 are mounted therein. The spacer bars 86 and edge bars 88 then are mounted on the drill guide means and secured loosely in place with nut 96. Since the edge bars and spacer bars are sized and drilled accurately, they locate the drill guide means with precision relative to one another.

Conventional sighting means are utilized to locate the drill guide means on the frame in precision alignment with the side stop 44 and the end stop 46. When the edge drill jig 80 accordingly is located accurately on the frame, it is mounted permanently by welding the cross braces 82 to the frame. The nuts 96 then are tightened securing the drill guide means rigidly.

The plank 20 is prepared in the first instance by sawing the leading edge 62 by conventional means forming an edge which is normal to the longitudinal axis of the plank. The plank then is inserted into the apparatus and rolled rearwardly on rollers 48 in the direction of the arrows of FIGS. 6A and 6B until the leading edge of the plank engages the end stop 46.

The hydraulic controls are activated by the operator to extend the hydraulic cylinder rams 56, displacing the plank sideways on the rollers until its longitudinal margin registers with the side stop 44. The hydraulic cylinders are left in this position during drilling, clamping the plank positively in the apparatus.

The trailing edge drill jig 70 is attached to the frame at the proper location for the length of plank desired, whereupon the plank is ready for drilling. Drilling may be by any conventional means such as a hand drill (not shown). The liner 97 is sized to accommodate the appropriate size drill bit 99 snugly. Thus the leading edge and trailing edge splice plate attachment holes 61 and 71 and the side connector holes 84 may be drilled quickly and accurately in the plank. It will be noted that the removable liner in the drill guide means allows liner replacement for drilling different sized holes, or upon wear.

After drilling, the hydraulic cylinder rams 56 are retracted, releasing the plank in the apparatus, allowing it to be repositioned for sawing its trailing margin 117 at the appropriate length. For this purpose the indexing means 116 is used to reposition the plank longitudinally in the frame. The indexing means is aligned initially by using conventional sighting means in conjunction with the adjustment bolts 120 properly to position cross elements 118 relative to the frame longitudinally. Lock nuts 124 and bolts 119 and 128 then are tightened, securing the indexing means in the proper position.

The plank is backed out of the apparatus a short distance until one or more predetermined side connector holes 84 are aligned with the proper drill guide means 68 located in the index bar, indexing the plank for cutting the trailing margin 117 at a desired plank length. Locating pins (not illustrated) may be inserted through the aligned drill guide means 68 and hole 84 to maintain this alignment. The hydraulic cylinders again may be activated, registering the plank against side stop 44. The drill guide means are located longitudinally in the index bar in such a manner that one or more drill guide means will align with associated side connector holes in the plank for each desired plank length.

The trailing margin 117 of the plank then is sawed by operating the rotary saw 98 and translating it on its ways 100. It will be noted that the saw may be located by means of threaded rods 112 and nuts 114 to cut the plank accurately normal to its longitudinal axis. The long handle 111 of the saw allows its manipulation by an operator located on the far side of the apparatus.

The hydraulic cylinders are retracted and the plank removed for installation into the truss-supported deck after which another plank may be inserted in the apparatus for drilling and sizing.

I claim:

1. An apparatus for forming planks for use in chord components of integral truss-supported decks formed from a plurality of planks interconnected at their leading and trailing edges by splice plates and at their sides by side connectors, comprising:

a. an elongate frame for supporting the planks, b. an end stop located at a first end of the frame for accurately positioning the planks longitudinally in the frame, c. a side stop located on one side of the frame for accurately positioning the planks laterally in the frame, d. registering means on the frame for registering one of the longitudinal margins of the planks positively with the side stop, e. a leading edge drill jig located at the first end of the frame above the leading edge of the planks adjacent the end stop, and a plurality of drill guide means, located in a spaced array in the leading edge drill jig for drilling splice plate attachment holes in a predetermined pattern in the leading edge of the planks, d. a trailing edge drill jig located at the opposite end of the frame above the trailing edge of the planks, and a plurality of drill guide means, located in the trailing edge drill jig in a spaced array for drilling splice plate attachment holes in a predetermined pattern in the trailing edge of the planks, and g. an edge drill jig located above the frame, and a plurality of drill guide means positioned in the edge drill jig for drilling side connector holes in a longitudinally spaced relation along the sides of the planks.

2. The apparatus of claim 1 wherein the edge drill jig comprises:

a. cross braces joined transversely to the top of the frame, b. drill guide means located in alternating ends of adjacent cross braces, c. spacer bars interconnecting the drill guide means of adjacent cross beams in a zig-zag pattern, and d. edge bars interconnecting adjacent drill guide means on like ends of the cross braces, and e. said spacer bars and edge bars being formed accurately to a predetermined length for precision location of the drill guide means relative to one another.

3. The apparatus of claim 2 wherein the drill guide means comprise:

a. a cylindrical body, b. means to attach the body to a supporting structure, c. said cylindrical body having a peripheral boss at one end and a threaded portion at the other end, d. said cylindrical body being dimensioned to fit snugly within holes located at the ends of the spacer bars and the edge bars for receiving contiguous pairs of said spacer bars and contiguous pairs of said end bars, and e. a nut configured to engage the threaded portion of the cylindrical body for securing said spacer bars and end bars thereon.

4. The apparatus of claim 1 including rollers rotatably mounted transversely on the frame at spaced intervals for carrying and translating the plank on the frame.

5. The apparatus of claim 1 including a rotary saw located at the trailing edge of the frame, and ways carrying the saw in a translatable manner transversely of the frame for sawing the trailing edge of the plank squarely.

6. The apparatus of claim 5 further including adjustment means interconnecting the saw and the frame for positioning the path of the saw accurately for cutting normal to the longitudinal axis of the plank.

7. The apparatus of claim 5 including indexing means for aligning the planks accurately at a predetermined position longitudinally relative to the saw allowing cutting the plank at a desired length.

8. The apparatus of claim 7 wherein the indexing means comprises:

a. cross elements located transversely to the frame near its trailing edge at spaced intervals, b. pivotal mounting means joining said cross elements to the frame at their first ends in a releasably pivotable manner and adjustable mounting means joining said cross elements to the frame at their second ends in a manner allowing adjustment along the frame, c. an index bar mounted below the second ends of the cross members releasably in a manner such that it always is aligned parallel to the frame, and d. drill guide means located in the index bar at spaced intervals, aligned with a vertical plane which passes through the drill guide means located in the edge drill jig.

9. The method of forming a plank for use in chord components of integral truss-supported decks including a plurality of planks interconnected longitudinally with splice plates and laterally with side connectors, comprising:

a. squaring the leading edge of the plank, b. placing the plank into a drill aligning apparatus, c. indexing the plank longitudinally in the apparatus, accurately locating it longitudinally relative to the apparatus, d. indexing the plank laterally in the apparatus, accurately locating it laterally relative to the apparatus, e. drilling splice plate locating holes at each end of the plank and side connector locating holes in a spaced relation along the sides of the plank, f. positioning said holes in the plank accurately relative to the apparatus in a predetermined pattern, and g. sawing the trailing edge of the plank at a predetermined length normal to the longitudinal centerline of the plank.

* * * * *